United States Patent
Bagade

(10) Patent No.: US 11,144,856 B1
(45) Date of Patent: Oct. 12, 2021

(54) BIDDING SYSTEM FOR SKILL-BASED ROUTING SYSTEM

(71) Applicant: NICE LTD, Ra'anana (IL)

(72) Inventor: Niranjan Nitin Bagade, Maharashtra (IN)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 16/822,045

(22) Filed: Mar. 18, 2020

(51) Int. Cl.
*G06Q 10/06* (2012.01)
*G06Q 30/08* (2012.01)

(52) U.S. Cl.
CPC ........... *G06Q 10/063118* (2013.01); *G06Q 10/063112* (2013.01); *G06Q 30/08* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 6,192,346 B1* | 2/2001 | Green | ............ | G06Q 10/063116 705/7.16 |
| 6,334,133 B1* | 12/2001 | Thompson | ..... | G06Q 10/063112 |
| 6,587,831 B1* | 7/2003 | O'Brien | ......... | G06Q 10/063116 705/7.16 |
| 7,337,139 B1* | 2/2008 | Ausubel | ................. | G06Q 30/08 705/35 |
| 8,589,239 B2* | 11/2013 | Zacarias | ........... | H04L 29/08522 705/26.3 |
| 9,930,181 B1* | 3/2018 | Moran | ................ | H04M 3/5238 |
| 10,535,024 B1* | 1/2020 | Westland | ....... | G06Q 10/063116 |
| 2003/0018509 A1* | 1/2003 | Ossip | ................... | G06Q 10/109 705/7.16 |
| 2003/0212589 A1* | 11/2003 | Kish | ..................... | G06Q 30/02 705/7.16 |
| 2004/0193489 A1* | 9/2004 | Boyd | ................. | G06Q 30/0225 713/176 |
| 2006/0224477 A1* | 10/2006 | Garcia | ............... | G06Q 30/0207 705/32 |
| 2007/0050228 A1* | 3/2007 | Beshears | ................ | G06Q 10/06 705/7.21 |
| 2007/0198329 A1* | 8/2007 | Lyerly | ............ | G06Q 10/063116 705/7.16 |
| 2008/0046305 A1* | 2/2008 | Garcia | ................ | G06Q 10/109 705/7.14 |

(Continued)

*Primary Examiner* — Alan S Miller
(74) *Attorney, Agent, or Firm* — Soroker Agmon Nordman

(57) ABSTRACT

A computerized-method for reducing overtime payment cost in a contact center due to multiple agents unexpected absence. The computerized-method comprising generating notifications as to an unexpected absence of agents in forthcoming shifts, displaying the notifications and enabling bidding process. Upon receiving a bidding request including requirements for an unfilled shift, operating a bidding unit to create a bidding session. Retrieving eligible agents according to the included requirements; sending the eligible agents a bidding-notification with an incentive amount; receiving bid amounts from bidders; sorting the bid amounts according to the value thereof; maintaining a list of top-lowest bidders; notifying each bidder if the bid amount is included in the list of top-lowest bidders and enable change of bid amount; notifying the bidders in the list of top-lowest bidders that they are assigned to the unfilled shift and provide the user details of the top-lowest bidders via the display unit.

18 Claims, 9 Drawing Sheets

(56) References Cited

U.S. PATENT DOCUMENTS

| | | | | |
|---|---|---|---|---|
| 2008/0126242 | A1* | 5/2008 | Banbury | G06Q 30/0275 |
| | | | | 705/37 |
| 2008/0243674 | A1* | 10/2008 | Pettersen | G06Q 40/02 |
| | | | | 705/37 |
| 2010/0257054 | A1* | 10/2010 | Martin | G06Q 30/02 |
| | | | | 705/14.46 |
| 2010/0318433 | A1* | 12/2010 | Kuperman | G06Q 30/02 |
| | | | | 705/14.71 |
| 2011/0099081 | A1* | 4/2011 | Pettersen | G06Q 40/04 |
| | | | | 705/26.3 |
| 2013/0090968 | A1* | 4/2013 | Borza | G06Q 10/06 |
| | | | | 705/7.16 |
| 2015/0350431 | A1* | 12/2015 | Steiner | G06Q 10/10 |
| | | | | 379/265.03 |
| 2017/0243170 | A1* | 8/2017 | Rashid | H04W 4/021 |
| 2018/0176156 | A1* | 6/2018 | Downey | H04L 51/04 |
| 2018/0191906 | A1* | 7/2018 | Moran | H04M 3/5238 |
| 2019/0095882 | A1* | 3/2019 | Parker | H04L 67/32 |

* cited by examiner

BIDDING SYSTEM FOR SKILL-BASED ROUTING SYSTEM

TECHNICAL FIELD

The present disclosure relates to the field of computerized systems and methods for efficient management and cost reduction of agents' overtime payments in a contact center managing thousands of agents.

BACKGROUND

Many organizations provide service to their customers around the globe via a contact center, which may be based in different locations and active around the clock. Commonly, the contact center is practicing an employment form of work shift of the agents which are employed in various forms of employment, such as part-time or full-time. For a proper level of quality of customer service, each shift is attributed with requirements such as a number of required agents and necessary agents skills according to anticipated workload and other considerations. To accommodate each shift requirements, each agent having a set of skills is assigned with multiple shifts in a certain period, ahead of time.

However, from the time of the assignment of the shift until the time the shift commenced, due to unforeseen circumstances, some of the agents which are assigned to that shift, may go on an unplanned leave. Consequently, the contact center may be understaffed during that shift and the quality of service might deteriorate when a certain amount of customers might be waiting for service for a long time.

On one hand, to avoid quality of service from deterioration, a supervisor in the contact center might have to instantaneously find a substitute agent that is having the same qualifications and set of skills as the agent that is on the unplanned leave, to prevent staffing problems, e.g., imbalance of staffing within different workgroups of the contact center, particularly when the contact center manages thousands of agents. Since the substitute agent is already having preassigned shifts, the additional time is considered as overtime and the contact center has to compensate the agent for it.

On the other hand, for reasons related to work-life balance, agents might not have the flexibility and the availability to work overtime each time they are requested to by the contact center. Therefore, the contact center has to pay a certain fixed amount as incentive to the agents, commonly, higher than the usual pay.

Thus, it may be desirable to have a system and a method for reduction of overtime payment cost in a contact center, due to multiple agents unexpected absence.

SUMMARY

There is thus provided, in accordance with some embodiments of the present disclosure, a computerized-method for reducing overtime payment cost in a contact center due to multiple agents unexpected absence.

In accordance with some embodiments of the present disclosure, a computerized system comprising a processor, and a memory including a database of a plurality of agents with a respective plurality of shifts over a period of time and one or more respective assigned skills of each agent, stored thereon, the computerized-method may generate by the processor one or more notifications as to an unexpected absence of one or more agents in forthcoming one or more shifts.

Furthermore, in accordance with some embodiments of the present disclosure, the computerized-method may display said one or more notifications to a user via a display unit and enable a bidding process.

Furthermore, in accordance with some embodiments of the present disclosure, upon receiving a bidding request, the computerized-method may include requirements for an unfilled shift and may operate a bidding unit to create a bidding session.

Furthermore, in accordance with some embodiments of the present disclosure, the bidding unit may be configured to retrieve from the database of the plurality of agents, one or more eligible agents according to the included requirements and then may send the one or more eligible agents a bidding notification with a proposed incentive amount and optionally other related information.

Furthermore, in accordance with some embodiments of the present disclosure, the computerized-method may receive one or more bid amounts which were placed by bidders who are one or more eligible agents. The computerized-method may sort the received one or more bid amounts according to the value thereof.

In accordance with some embodiments of the present disclosure, the computerized-method may maintain a list of top lowest bidders having a preconfigured number of lowest bid amounts and notify each bidder if the bid amount that the bidder placed is included in the list of top lowest bidders and enable change of bid amount.

Furthermore, in accordance with some embodiments of the present disclosure, the computerized-method may keep receiving bid amounts and sorting the amounts to maintain a list of top lowest bids and notify each bidder if the bidders' bid is in the list of top lowest bidders until a preconfigured condition is met.

Furthermore, in accordance with some embodiments of the present disclosure, after the preconfigured condition is met, the computerized-method may notify the bidders in the list of top lowest bidders that they are assigned to the unfilled shift and provide the user who initiated the bidding session, e.g., a supervisor, the details of the top lowest bidders via the display unit.

Furthermore, in accordance with some embodiments of the present disclosure, eligible agents are agents who possess unfilled shift required skills and currently not working or will be off shift soon.

Furthermore, in accordance with some embodiments of the present disclosure, the included requirements of the unfilled shift include at least one of: required one or more skill, amount of incentive, bidding session start and end time, number of agents required, or any combination thereof.

Furthermore, in accordance with some embodiments of the present disclosure, the preconfigured condition may be a bidding session end time.

Furthermore, in accordance with some embodiments of the present disclosure, the preconfigured condition may be a predetermined reduction in total incentive cost.

Furthermore, in accordance with some embodiments of the present disclosure, the bidding unit may be further configured to calculate reduction in overtime payment cost by summing up reduction of each bid amount in the list of top lowest bidders from the proposed incentive amount.

Furthermore, in accordance with some embodiments of the present disclosure, the received one or more bid amounts placed by bidders is less than the proposed incentive amount.

Furthermore, in accordance with some embodiments of the present disclosure, the bidding notification may be sent by a notification application. The notification application may be Amazon Simple Notification Service (SNS).

There is further provided, in accordance with some embodiments of the present invention, a computerized-system for reducing overtime payment cost in a contact center due to multiple agents unexpected absence.

Furthermore, in accordance with some embodiments of the present disclosure, the computerized-system may include a memory including a database of a plurality of agents with a respective plurality of shifts over a period of time and one or more respective assigned skills of each agent, stored thereon, and a processor.

Furthermore, in accordance with some embodiments of the present disclosure, the processor in the computerized-system may be configured to: generate one or more notifications as to unexpected absence of one or more agents in forthcoming one or more shifts and may display one or more notifications to a user via a display unit and enable bidding process.

Furthermore, in accordance with some embodiments of the present disclosure, upon receiving a bidding request having requirements for an unfilled shift, the processor may operate a bidding unit to create a bidding session.

Furthermore, in accordance with some embodiments of the present disclosure, the bidding unit may be configured to: (a) retrieve from the database of the plurality of agents, one or more eligible agents according to the included requirements; (b) send the one or more eligible agents a bidding notification with a proposed incentive amount and optionally, other related information; (c) receive one or more bid amounts placed by bidders wherein the bidders are one or more eligible agents who placed a bid; (d) sort the received one or more bid amounts according to the value thereof; (e) maintain a list of top lowest bidders having a preconfigured number of lowest bid amounts; (f) notify each bidder if the bid amount that the bidder placed is included in the list of top lowest bidders and enable change of bid amount; (g) repeat (c) through (f) until a preconfigured condition is met; and (h) notify the bidders in the list of top lowest bidders that they are assigned to the unfilled shift and provide the user details of the top lowest bidders via the display unit.

Furthermore, in accordance with some embodiments of the present disclosure, eligible agents are agents who possess unfilled shift required qualifications and skills and are not scheduled to work during the time slot of the bidding session or will be off shift soon. Meaning, eligible agents are not working during the time slot in which the bidding channel is opened. For example, when an agent is scheduled to work in a shift which starts at 10 AM to 6 PM, then, the agent may participate only in a bidding session from 6 PM to 7 PM because it is after the agent's scheduled shift ends. The agent may not participate in a bidding session time slot which starts at 3 PM to 4 PM because the agent is already working in a shift which overlaps the bidding session time slot. Optionally, an eligible agent may not participate in a bidding session to an unfilled shift that the agent is already scheduled to.

Furthermore, in accordance with some embodiments of the present disclosure, the included requirements of the unfilled shift include at least one of: required one or more skill, amount of incentive, bidding session start and end time, number of agents required, or any combination thereof.

Furthermore, in accordance with some embodiments of the present disclosure, the preconfigured condition may be bidding session end time.

Furthermore, in accordance with some embodiments of the present disclosure, the preconfigured condition may be a predetermined reduction in incentive cost.

Furthermore, in accordance with some embodiments of the present disclosure, the bidding unit may be further configured to calculate reduction in overtime payment cost by summing up reduction of each bid amount in the list of top lowest bidders from the proposed incentive amount.

Furthermore, in accordance with some embodiments of the present disclosure, the received one or more bid amounts placed by bidders may be less than the proposed incentive amount.

Furthermore, in accordance with some embodiments of the present disclosure, the bidding notification may be sent by a notification application and the notification application may be Amazon Simple Notification Service (SNS).

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION

Figure 1:
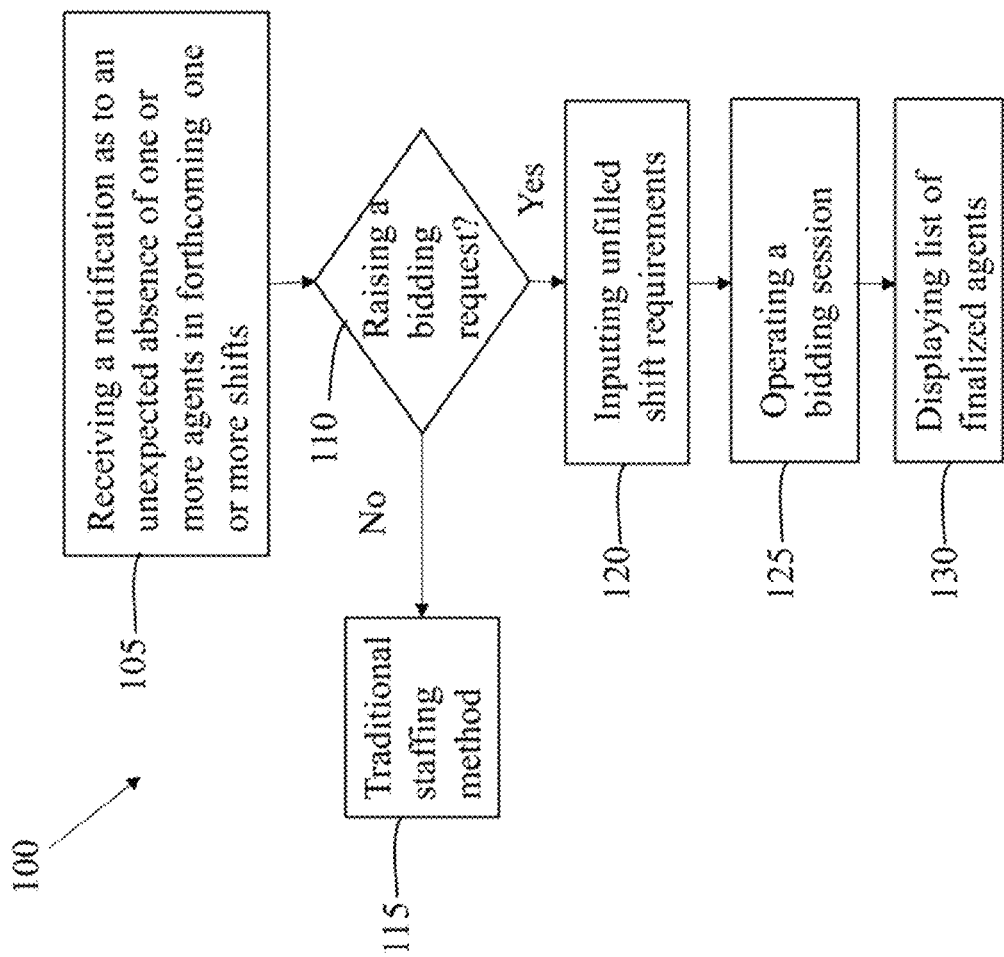
FIG. 1 schematically illustrates a high-level diagram of a computerized-method for reducing overtime payment cost in a contact center due to multiple agents unexpected absence, in accordance with some embodiments of the present invention.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

As used herein, the term "requirements" refers to the number of people needed to answer all expected inbound interactions for a call center in a given time interval. The expected inbound interactions may come in via calls, SMS, email, chat, video, etc.

As used herein, the term "Workforce Management System (WFM)" refers to desktop and mobile applications which assist businesses to create a work schedule for a certain period. WFM forecasts and schedules agents and updates forecasts based on variance between actual events and forecasted events potentially indicating a need for extra hours.

As used herein, the term "Employee Engagement Manager (EEM)" refers to desktop and mobile applications to allow agents to view or change schedules anywhere, at any time via any browser or a smartphone application. The EEM user interface is continually updated to reflect projected demand. EEM currently uses updates from WFM to suggest specific agents for extra hours. It also equips managers with a dashboard to monitor agent intraday performance to better manage performance.

As used herein, the term "incentive" refers to a reward to be allocated to an agent when adding a given time interval to a certain scheduled shift or when a shift that was not previously scheduled is being added to the agent.

As used herein, the term "supervisor" refers to a user that is managing one or more groups of agents and their shifts.

According to some embodiments, in a contact center that is employing thousands of agents which are sometimes based in different locations across the globe, a contact center supervisor might face staffing issues when assigning agents with specific skills to work overtime. The issues might worsen when agents which are assigned to overtime duties are on an unplanned leave.

To maintain a proper level of quality of service the supervisor has not only to find an available substitute for each absent agent but also an agent having the same qualifications and skills as the agent that is on the unplanned leave to keep the contact center from being understaffed. The search for qualified substitute agents to meet a surge in overtime requirements might put extra work load on the supervisor and prevent or adhere her from completing other tasks. In a contact center employing thousands of agents, located in different locations, the action of searching for multiple qualified substitute agents in a short time before the beginning of an unfilled shift begins, might not even be doable or feasible.

Commonly, agents in a contact center must work overtime upon request of a supervisor and they are being paid a certain amount of incentive for it. However, other than the cost of the incentive to the contact center, such a request might pose an extra load on the agent which is already facing work-life balance issues due to the contact center demand for shifts during different hours of the day. Sometimes, the agent might not have the flexibility and the option to work overtime due to personal issues.

In a contact center having 10,000 agents, every day approximately 1% of the agents, that is 100 agents, are absent from shifts because they are not available or on unplanned leave or on sick leave. Therefore, to solve the understaffing situation a supervisor must pay an incentive amount to the agents who would be assigned to overtime duties to handle tasks which were given to the absent agents. These incentive payouts are typically higher than the regular payouts and may accumulate to a high annual amount.

Currently, agents do not have the opportunity to choose when to work overtime and earn the certain amount of incentive and supervisors in the contact centers waste time to meet surge in overtime requirements. Therefore, to address both understaffed shifts issues and agents' personal issues, a technical solution is needed that will reduce overtime payment cost in the contact center in case of multiple agents unexpected absence and allow agents to choose overtime shifts in time intervals that best suit their personal needs.

FIG. 1 schematically illustrates a high-level diagram of a computerized-method 100 for reducing overtime payment cost in a contact center due to multiple agents unexpected absence, in accordance with some embodiments of the present invention.

Figure 2:
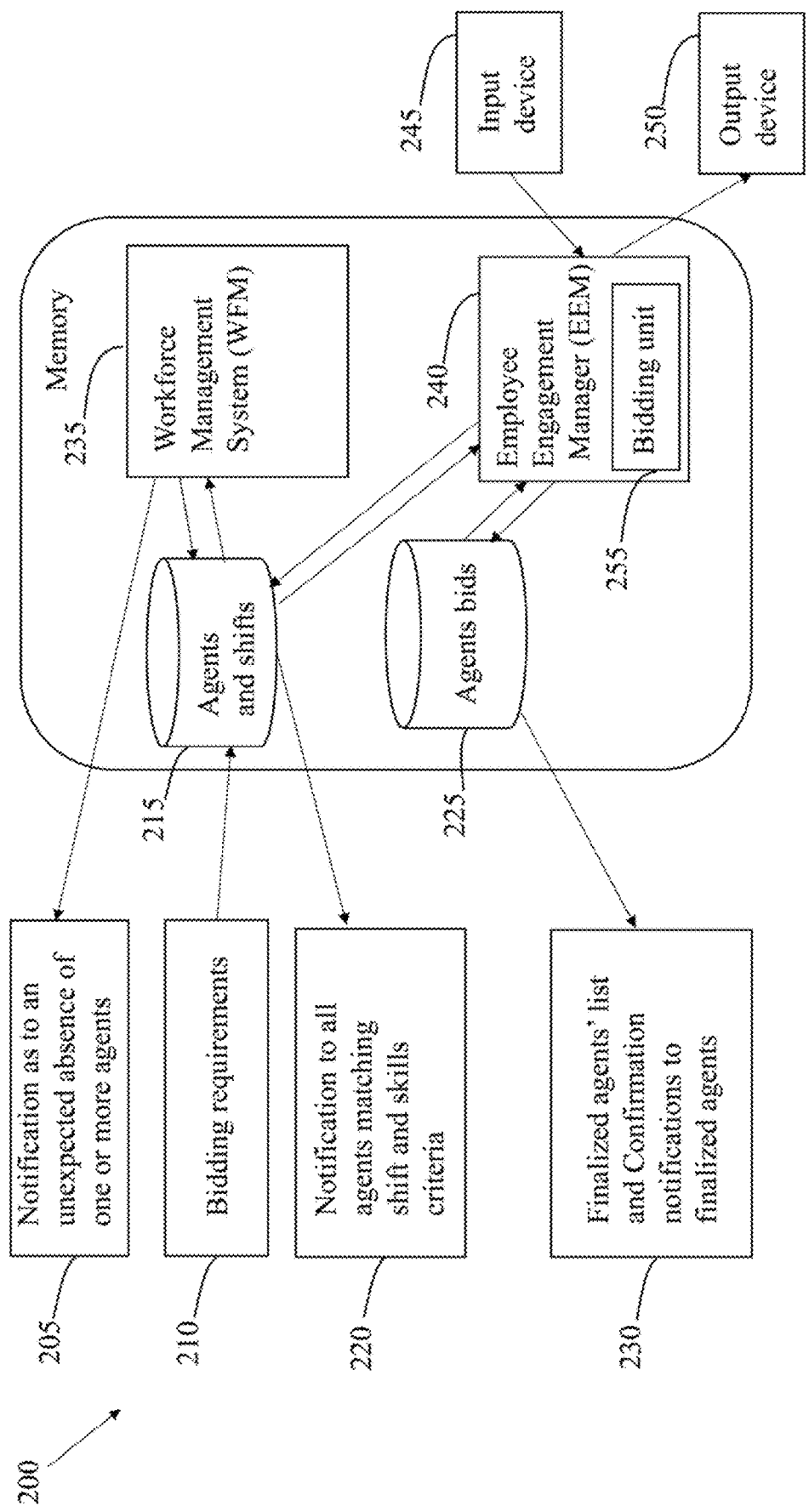
FIG. 2 schematically illustrates a high-level diagram of a computerized-method for operating a bidding unit to create a bidding session, in accordance with some embodiments of the present invention.

According to some embodiments, the computerized-method 100 may comprise operation 105, which may comprise receiving by a user such as a supervisor in a contact center a notification from WFM software module 235 in FIG. 2 via output device 250 in FIG. 2 connected to EEM application/module 240 in FIG. 2 as to an unexpected absence of one or more agents in forthcoming one or more shifts. To overcome staffing issues in an unfilled shift, the supervisor may be displayed with the option to raise a bidding request to eligible agents, by displaying said one or more notifications to a user via a display unit and enabling bidding process. That is, method 100 may comprise operation 110, which may comprise raising a bidding request.

According to some embodiments, when the supervisor is not busy or when the amount of absent agents is very low and the supervisor is ready to absorb the full amount of incentives, the supervisor may turn to traditional staffing methods 115.

Figure 4:
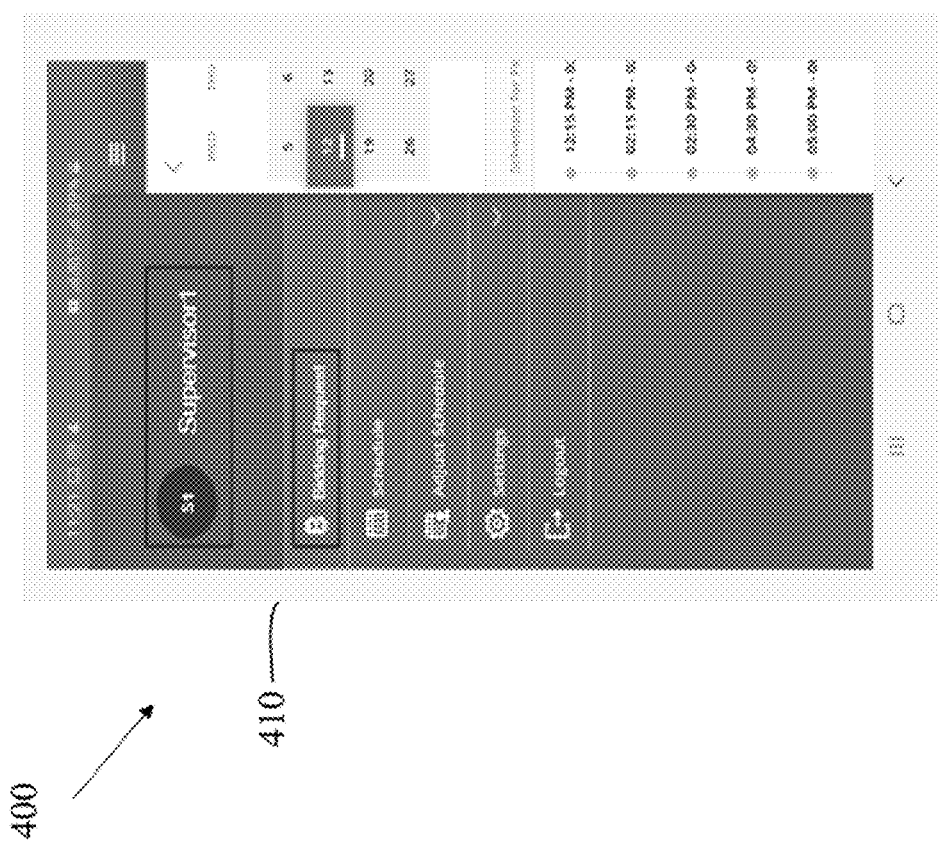
FIG. 4 depicts a screen shot GUI of an option to raise bidding request, in accordance with some embodiments of the present invention.

According to some embodiments, when the supervisor is eager to save time and reduce the cost of incentive payments to agents for overtime, the supervisor might use the option to raise a bidding request 110, such as button 410 in GUI 400 as shown in FIG. 4 via an input device such as input device 245 in FIG. 2.

According to some embodiments, method 100 may further comprise operation 120, which may comprise inputting unfilled shift requirements. In some embodiments, the supervisor may input via the input device 245 in FIG. 2 unfilled shift requirements such as qualifications and requirements of agents, number of agents needed, e.g., 10 agents, time slot of the unfilled shift, i.e., time of beginning of shift and time of the end of the shift, such as element 510*a* in FIG. 5A and element 510*b* in FIG. 5B and maximum amount that will be paid as an incentive, i.e., extra payment, to the agent, e.g. 20$ per hour as shown by element 520*b* in FIG. 5B.

According to some embodiments, the qualifications of the one or more agents might be for example, proficiency in credit card handling or a certain level of technical support and the like. The requirements may be for example, Spanish speaking and writing as a mother-tongue, because inbound interactions of Spanish-speaking customers are expected during the time slot of the unfilled shift.

According to some embodiments, method 100 may comprise operation 125, which may comprise operating a bidding session after all the unfilled shift requirements have been entered. The bidding session may end at the time that the supervisor has determined in the input requirement shift requirements stage 120 or when another preconfigured condition has been met. For example, when a preconfigured amount of eligible agents have placed a bid after a certain amount of time. Meaning, a bidding session will end only when reaching the preconfigured bidding session end time. Till the preconfigured bidding session end time is reached, all eligible agents may participate in the bidding session.

According to some embodiments, method 100 may further comprise operation 130, which may comprise displaying list of finalized agents after the bidding session has been terminated. The list of finalized agents may be presented to the supervisor via an output device such as output device 250 and notifications may be sent to all the agents in the list, announcing them that they have won the bid. Furthermore, a calculation of the reduction of the amount that the bid had saved during the current bid would be presented to the supervisor such as element 810 in FIG. 8. The reduction of the amount that the bid had saved may be calculated by summing all up reduction of each bid amount in the list of top lowest bidders from the initially proposed incentive amount by the supervisor, i.e., extra payment, to the agent, e.g. 20$ per hour as shown by element 520*b* in FIG. 5B. The accumulated savings from all past bids of the supervisor over a preconfigured amount of time may also be presented to the supervisor, such as element 820 in FIG. 8.

According to some embodiments, operating the bidding session may reduce incentive payouts by 30% to 40%. The saving effect may increase with the number of agents in the contact center.

FIG. 2 schematically illustrates a high-level diagram of a computerized-method 200 for operating a bidding unit to create a bidding session, in accordance with some embodiments of the present invention.

According to some embodiments, in a computerized-system, comprising a processor, and a memory and including a database of a plurality of agents with a respective plurality of shifts over a period of time and one or more respective assigned skills of each agent, stored thereon.

The computerized-system may further include, a communication module and a user interface, an input device such as input device 245 and an output device such as output device 250. The processor may include one or more processing units, i.e., of one or more computers. The processor may be configured to operate in accordance with programmed instructions which are stored in the memory. Furthermore, the processor may be capable of executing the machine learning algorithm.

The processor may communicate with the output device 250. For example, the output device may include a computer monitor or screen. The processor may communicate with a screen of the output device to display, for example, a work schedule with suggested distributed tier incentive structure e.g., via Employee Engagement Manager (EEM) platform or application, and other suitable requirements which determine the bidding session frame. In another example, the output device may include a printer, display panel, speaker, or another device capable of producing visible, audible, or tactile output.

The processor may communicate with the input device 245. For example, the input device 240 may include one or more of a keyboard, keypad, or pointing device for enabling a user to inputting data or instructions for operation of the processor.

The processor may further communicate with the memory. The memory may include one or more volatile or nonvolatile memory devices. The memory may be utilized to store, for example, programmed instructions for operation of the processor, data or parameters for use by the processor during operation, or results of operation of the processor. The memory may include databases agents and shifts 215 and agents bids 225, stored thereon. The data stored in the databases 215 and 225 may include, in part, planned shifts for each agent, work schedule, templates of Employee Engagement Manager (EEM) application, time off preference, time on preference, request absence input parameters (date, code, start time and end time), agent assignments, agent schedules, agent skill mappings and the like.

The memory may include a computer readable medium for storing program instructions for operation of the processor. In this example, the programmed instructions may take the form of EEM application/module 240, the form of WFM application/module 235 or the form of a bidding unit such as bidding unit 255 to operate a bidding session, which is running on the processor.

According to some embodiments, Workforce Management System (WFM) 235 software module and EEM application/module 240 may operate on the computerized system or may operate on a different computer at a different location communicating with the computerized system over a communication network.

According to some embodiments, generating by the processor one or more notifications as to an unexpected absence of one or more agents in forthcoming one or more shifts, displaying said one or more notifications to a user via a display unit such as output device 250 and enabling a bidding process.

According to some embodiments, after a notification as to an unexpected absence of one or more agents 205 which may be received from WFM software module 235 and before starting a bidding session, all biding requirements may be entered 210 by a supervisor via EEM application/module 240 that is connected to an input device 245. The entered bidding requirements may include among other details as described above, agents' qualifications and skills which are needed for the unfilled shift.

Figure 6:
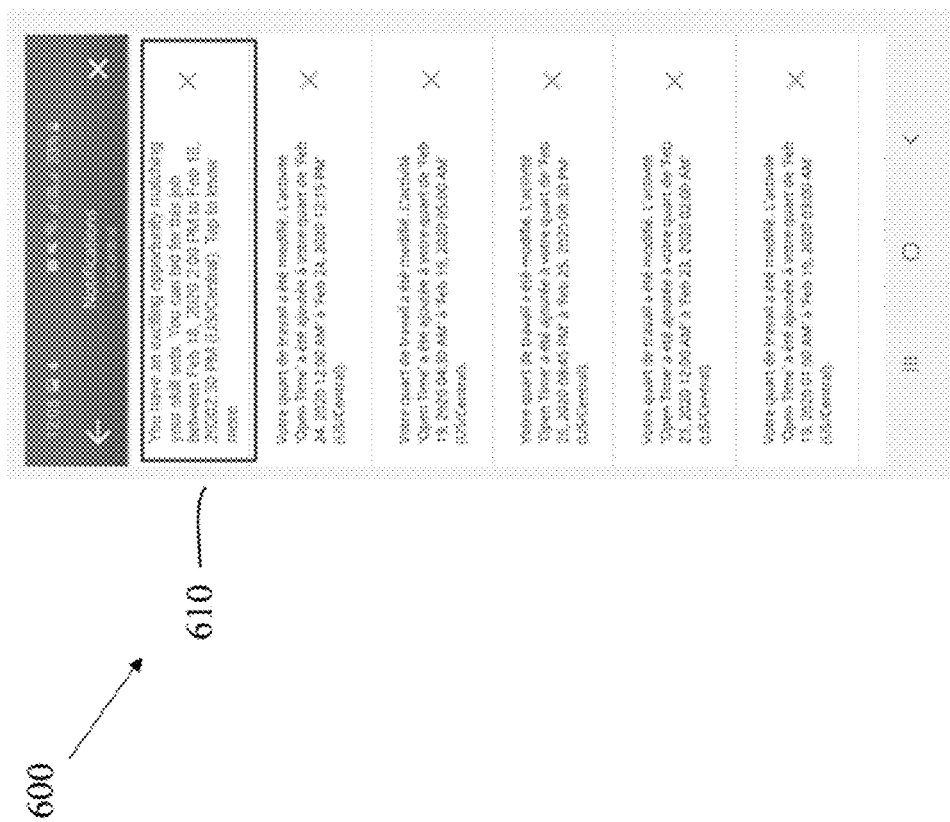
FIG. 6 depicts a screen shot GUI of a list of notifications about all available bidding opportunities for an agent, in accordance with some embodiments of the present invention.

According to some embodiments, relevant details of agents having the required qualifications and skills will be retrieved from the agents and shifts database 215 to send notifications to all agents e.g. 50 agents, which are matching unfilled shift and skills criteria 220 such as for example, notification 610 in FIG. 6 "You have an exciting opportunity matching your skill sets. You can bid for this job between Feb. 18, 2020 2:00 PM to Feb. 18, 2020 2:30 PM (US/Central). Tap to know more."

Figure 5A:
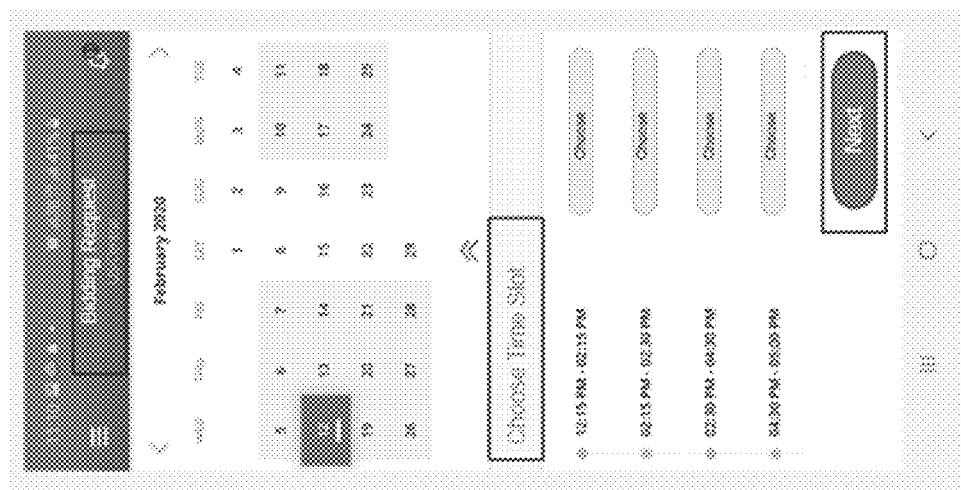
FIG. 5A depicts a screen shot GUI to decide the bidding time slot, in accordance with some embodiments of the present invention.
Figure 5B:
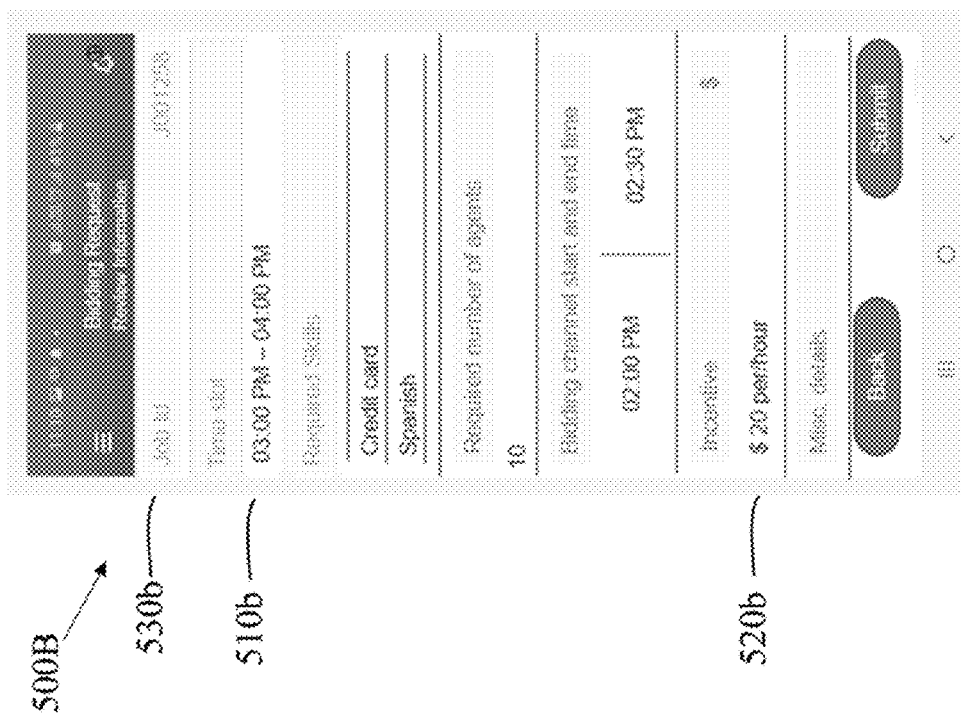
FIG. 5B depicts a screen shot GUI of bidding channel attributes, in accordance with some embodiments of the present invention.

According to some embodiments, in case the agent is interested in participating in the bid, the agent may enter her proposed bid amount, which may be less than the maximum amount that has been entered to be paid as an incentive e.g., element 520b in FIG. 5B. Bidders may be one or more eligible agents who placed a bid.

According to some embodiments, one or more bid amounts may be placed by optional bidders e.g. 40 agents out of the 50 agents. Only minimum bid amounts may be part of a finalized agents' list. For example, if a supervisor has a requirement for 10 agents with a credit card proficiency and Spanish as a mother-tongue skill, and 50 agents possess both skills, the supervisor may enter a maximum amount of 20$ per hour per agent. When, for example, 40 agents have decided to bid, and the distribution of the bidding amounts is for example, as follows: bidding amount less than 15$ by 10 agents; bidding amount between 15$ to 16$ by 15 agents, and the remaining 15 agents have placed a bidding amount of more than 16$, then only agents with minimum incentive expectations will get the opportunity to work for a the bided shift i.e., the 10 agents who placed an amount less than 15$. The bid amounts may be stored in a database such as agents bids database 225. The placed one or more bid amounts may be sorted according to their value by a bidding unit 255 that may be integrated in EEM application/module 240.

According to some embodiments, a list of top lowest bidders having a preconfigured number of lowest bid amounts may be maintained by the bidding unit 255 that may be integrated in EEM application/module 240.

Figure 7A:
FIGS. 7A-7B depict screen shots of bid notifications for an agent, in accordance with some embodiments of the present invention.

According to some embodiments, during the bidding session each bidder may receive a notification if the bid amount that the bidder placed is included in the list of top lowest bidders and enable change of bid amount, such as notification 710a, in FIG. 7A, e.g., "You are not among lowest bidders" and the bidder may re-enter a lower bid.

According to some embodiments, after the bidding session terminates a finalized agents' list may be sent to the supervisor and as well as a confirmation notifications to the finalized agents 225. The list may be displayed via EEM application/module 240 by a connected output device 250.

Thus, by operating the bidding session the contact center may save the cost of incentive payouts as agents may bid for lesser incentives than the originally offered bid by the supervisor. The supervisor in the contact center may have the opportunity to have appropriately skilled agents available based on the need of the hour and also save time as she doesn't need to manage agent overtime assignments. The agents of the contact center may have an opportunity of getting extra incentives and making efficient use of their personal time, and more flexibility in terms of overtime. Lastly, the agents may be motivated to acquire new skills so they may be eligible to participate in more bidding sessions and to earn more incentives.

Figure 3A:
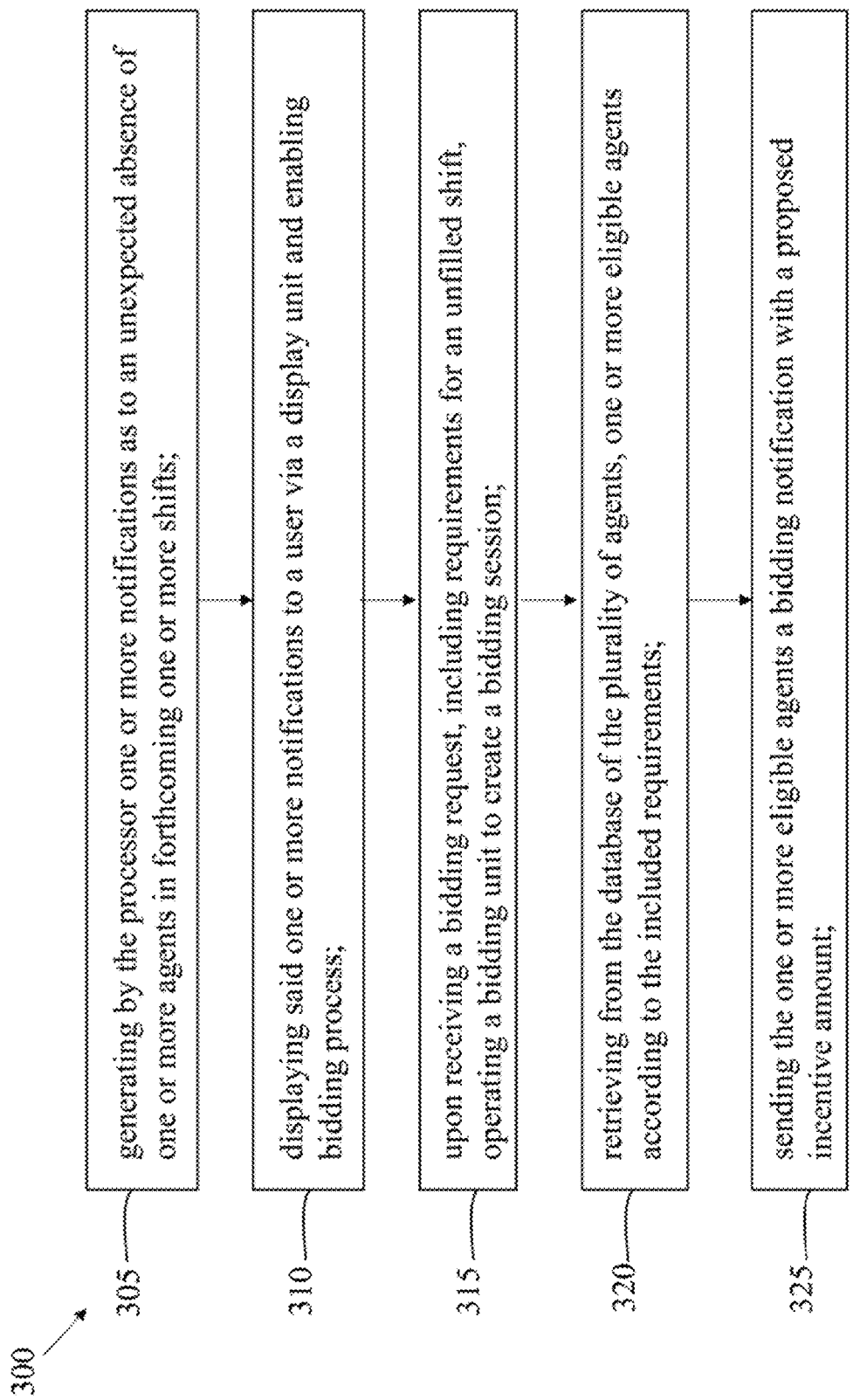
FIGS. 3A-3B are a flowchart depicting a method for reducing overtime payment cost in a contact center due to multiple agents unexpected absence, in accordance with some embodiments of the present invention.
Figure 3B:
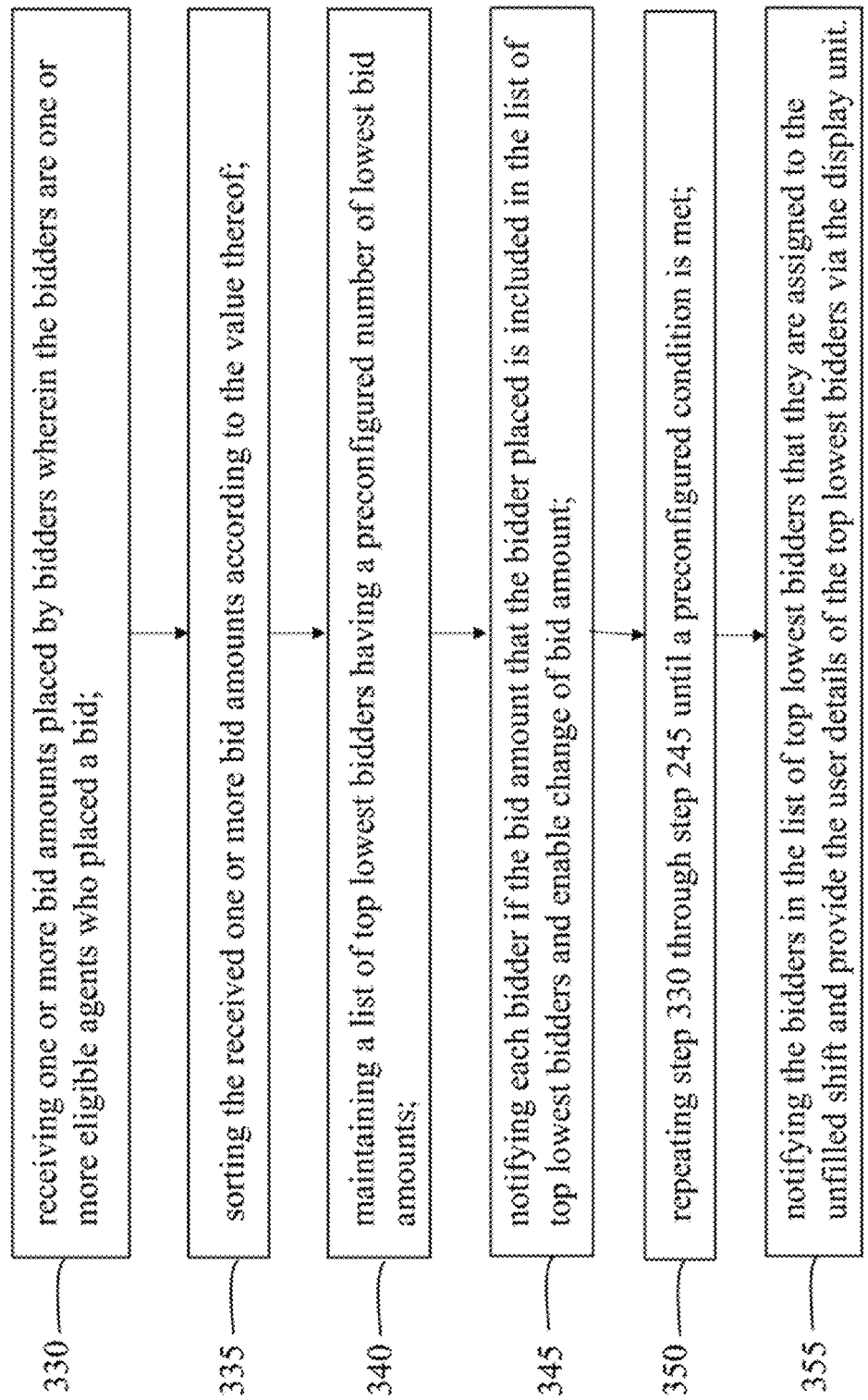

FIGS. 3A-3B are a flowchart depicting a method 300 for reducing overtime payment cost in a contact center due to multiple agents unexpected absence, in accordance with some embodiments of the present invention.

According to some embodiments, operation 305 may comprise generating by the processor one or more notifications as to an unexpected absence of one or more agents in forthcoming one or more shifts.

According to some embodiments, operation 310 may comprise displaying said one or more notifications to a user via a display unit and enabling bidding process.

According to some embodiments, operation 315 may comprise upon receiving a bidding request, including requirements for an unfilled shift, operating a bidding unit to create a bidding session.

According to some embodiments, operation 320 may comprise retrieving from the database of the plurality of agents, one or more eligible agents according to the included requirements.

According to some embodiments, operation 325 may comprise sending the one or more eligible agents a bidding notification with a proposed incentive amount and optionally, other related information. Other related information may be bidding session start and end time, job description i.e., unfilled shift description, and the unfilled shift start and end time.

According to some embodiments, operation 330 may comprise receiving one or more bid amounts placed by bidders wherein the bidders are one or more eligible agents who placed a bid.

According to some embodiments, operation 335 may comprise sorting the received one or more bid amounts according to the value thereof.

According to some embodiments, operation 340 may comprise maintaining a list of top lowest bidders having a preconfigured number of lowest bid amounts.

According to some embodiments, operation 345 may comprise notifying each bidder if the bid amount that the bidder placed is included in the list of top lowest bidders and enable change of bid amount.

According to some embodiments, operation 350 may comprise repeating operation 330 through operation 345 until a preconfigured condition is met.

According to some embodiments, operation 355 may comprise notifying the bidders in the list of top lowest bidders that they are assigned to the unfilled shift and provide the user details of the top lowest bidders via the display unit.

FIG. 4 depicts a screen shot GUI of an option to raise bidding request, in accordance with some embodiments of the present invention.

According to some embodiments, a supervisor may see an option in a menu such as menu 400 to create a bidding request. To operate a bidding session, the supervisor may tap on the 'bidding request' button such as 'bidding request' button 410. The menu 400 may be displayed by an output device 240 in FIG. 2 that is connected to EEM application/module 240 in FIG. 2. By tapping the 'bidding request' button 410 a bidding session may start and operated by bidding unit 255 in FIG. 2.

FIG. 5A depicts a screen shot GUI 500A to enter the bidding time slot, in accordance with some embodiments of the present invention.

According to some embodiments, the supervisor may enter an unfilled shift time slot to the bidding unit 255 in FIG. 2, which is operating the bidding session. The Bidding unit 255 may be integrated in EEM application/module 240 via an input device 245 in FIG. 2. To move forward to next display screen, the supervisor may tap the 'next' button.

FIG. 5B depicts a screen shot GUI 500B of bidding channel attributes, in accordance with some embodiments of the present invention.

According to some embodiments, a job identification (ID) may be assigned to each bidding session such as job ID 530*b* denoted as 'Job ID J001258'. The supervisor may enter the bidding unit 255 in FIG. 2 that is integrated in EEM application/module 240 in FIG. 2, via an input device 245 in FIG. 2, all skills and qualifications, e.g., requirements that are needed to the unfilled shift that the bidding session has been created for. The supervisor may further input information like the required number of agents to the unfilled shift, the starting time of the bid and end time. Incentive information will also be provided along with miscellaneous details to be later on displayed on an output device 250 in FIG. 2 that is connected to the EEM application/module 240 in FIG. 2. After all needed information has been inserted the supervisor may submit the bidding request.

FIG. 6 depicts a screen shot GUI of a list of notifications 600 about all available bidding opportunities for an agent, in accordance with some embodiments of the present invention.

According to some embodiments, after the supervisor has submitted the bidding request, all eligible agents may receive, via output device 250 in FIG. 2 that is connected to EEM application/module 240 in FIG. 2 a notification about an available opportunity to place a bid for an unfilled shift that matches the agents' skills and qualifications. The agent may tap on the notification, such as notification 610 to receive more information about the suggested unfilled shift. For example, "You have an exciting opportunity matching your skill sets. You can bid for this job between Feb. 18, 2020 2:00 PM to Feb. 18, 2020 2:30 PM (US/Central). Tap to know more."

Figure 7B:
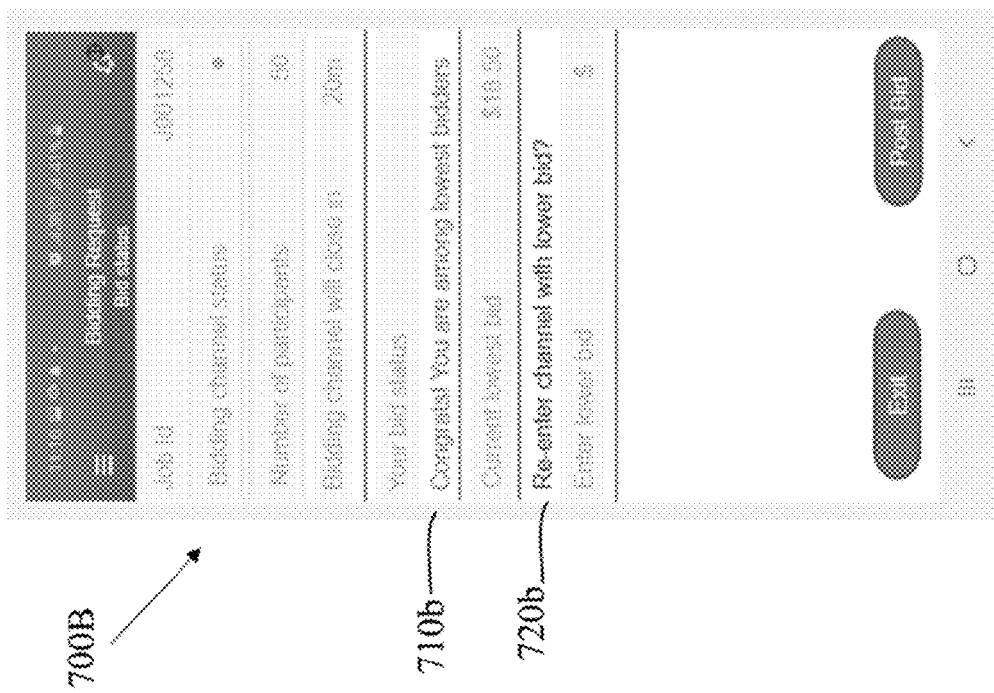

FIGS. 7A-7B depict screen shots of bid notifications for an agent 700A and 700B, in accordance with some embodiments of the present invention.

According to some embodiments, a bidding status such as bidding status 710*a* in FIG. 7A may be presented to the agent via output device 250 in FIG. 2 that is connected to EEM application/module 240 in FIG. 2 to notify the agent that the bid that the agent has placed is not among the lowest bidders, meaning that the agent won't win the bid with the current proposed amount that the agent has placed.

According to some embodiments, the agent may be presented via output device 250 in FIG. 2 that is connected to EEM application/module 240 in FIG. 2 with the option to re-enter a lower amount for example, such as element 720*a* "Re-enter channel with lower bid?".

According to some embodiments, a bidding status such as bidding status 710*b* in FIG. 7B may be presented to the agent via output device 250 in FIG. 2 that is connected to EEM application/module 240 in FIG. 2 to notify the agent that the agent is among the lowest bidders, meaning that the agent has win the bid.

According to some embodiments, the agent may be presented via output device 250 in FIG. 2 that is connected to EEM application/module 240 in FIG. 2 with the option to re-enter a lower amount for example, such as element 720*b* "Re-enter channel with lower bid?".

Figure 8:
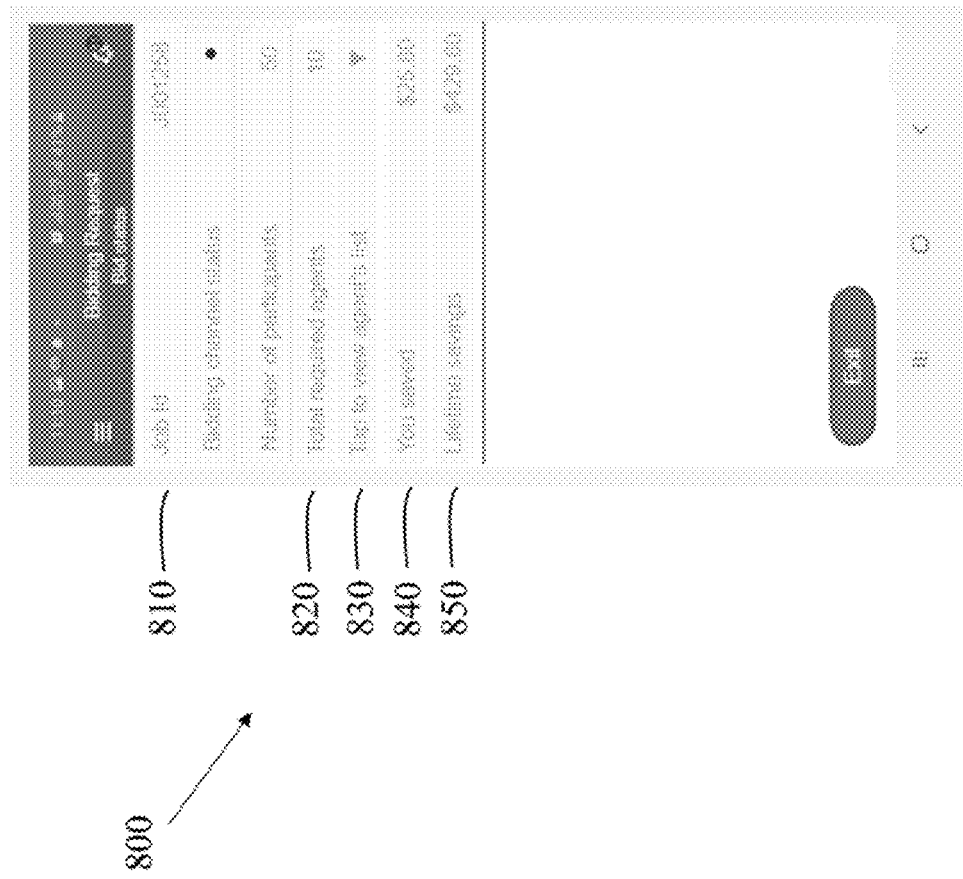
FIG. 8 depicts a screen shot GUI to provide information about the bid details and the amount saved, in accordance with some embodiments of the present invention.

FIG. 8 depicts a screen shot GUI to provide information about the bid details and the amount saved 800, in accordance with some embodiments of the present invention.

According to some embodiments, when the bidding session has terminated the supervisor may receive a notification such as notification 800 including bidding information via output device 250 in FIG. 2 that is connected to EEM application/module 240 in FIG. 2. For example, job ID 810 that is associated with the bidding request, total required agents 820, an option to view the list of agents that have won the bid with the lower amount of bid, the amount that has been saved by the creation of the biding session and accumulated amount saved in past bids It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for reducing overtime payment cost in a contact center due to multiple agents unexpected absence, the computerized-method comprising:

in a computerized system comprising a processor, and a memory including a database of a plurality of agents with a respective plurality of shifts over a period of time and one or more respective assigned skills of each agent, stored thereon, operating by the processor a Workforce Management System (WFM) to generate one or more notifications as to an unexpected absence of one or more agents in forthcoming one or more shifts, displaying said one or more notifications to a user via a display unit and enabling a bidding process via an Employee Engagement Manager (EEM) platform, upon receiving a bidding request including requirements for an unfilled shift, via the EEM platform, operating a bidding unit that is integrated thereto, to create a bidding session, the bidding unit is configured to:

(a) retrieve from the database of the plurality of agents, one or more eligible agents according to the included requirements;

(b) send the one or more eligible agents a bidding notification with a proposed incentive amount;

(c) receive one or more bid amounts placed by bidders wherein the bidders are one or more eligible agents who placed a bid;
(d) sort the received one or more bid amounts according to the value thereof;
(e) maintain a list of top lowest bidders having a preconfigured number of lowest bid amounts;
(f) notify each bidder if the bid amount that the bidder placed is included in the list of top lowest bidders and enable change of bid amount;
(g) repeat (c) through (f) until a preconfigured condition is met; and
(h) notify the bidders in the list of top lowest bidders that they are assigned to the unfilled shift and provide the user details of the top lowest bidders, via the display unit,
wherein the preconfigured condition is a predetermined reduction in incentive cost.

2. Die computerized-method of claim 1, wherein eligible agents are agents who possess unfilled shift required skills and currently not working or will be of shift soon.

3. The computerized-method of claim 1, wherein the included requirements of the unfilled shift include at least one of: required one or more skill, amount of incentive, bidding session start and end time, number of agents required, or any combination thereof.

4. The computerized-method of claim 1, wherein the preconfigured condition is bidding session end time.

5. The computerized-method of claim 1, wherein the bidding unit is further configured to calculate reduction in overtime payment cost by:
summing up reduction of each bid amount in the list of top lowest bidders from the proposed incentive amount.

6. The computerized-method of claim 1, wherein the received one or more bid amounts placed by bidders is less than the proposed incentive amount.

7. The computerized-method of claim 1, wherein the bidding notification is sent by a notification application.

8. The computerized-method of claim 7, wherein the notification application is Amazon Simple Notification Service (SNS).

9. A computerized-system for reducing overtime payment cost in a contact center due to multiple agents unexpected absence, the computerized-system comprising:
a memory including a database of a plurality of agents with a respective plurality of shifts over a period of time and one or more respective assigned skills of each agent, stored thereon, and
a processor configured to:
operate a Workforce Management System (WFM) to generate one or more notifications as to unexpected absence of one or more agents in forthcoming one or more shifts and display said one or more notifications to a user via a display unit and enable bidding process via an Employee Engagement Manager (EEM) platform,
upon receiving a bidding request having requirements for an unfilled shift, via the EEM platform, operate a bidding unit that is integrated thereto to create a bidding session, the bidding unit is configured to:
(a) retrieve from the database of the plurality of agents, one or more eligible agents according to the included requirements;
(b) send the one or more eligible agents a bidding notification with a proposed incentive amount;
(c) receive one or more bid amounts placed by bidders wherein the bidders are one or more eligible agents who placed a bid and store it in an agents bids database;
(d) sort the received one or more bid amounts according to the value thereof;
(e) maintain a list of top lowest bidders having a preconfigured number of lowest bid amounts;
(f) notify each bidder if the bid amount that the bidder placed is included in the list of top lowest bidders and enable change of bid amount;
(g) repeat (c) through (f) until a preconfigured condition is met; and
(h) notify the bidders in the list of top lowest bidders that they are assigned to the unfilled shift and provide the user details of the top lowest bidders, via the display unit,
wherein the preconfigured condition is a predetermined reduction in incentive cost.

10. The computerized-method of claim 9, wherein eligible agents are agents who possess unfilled shift required skills and currently not working or will be off shift soon.

11. The computerized-system of claim 9, wherein the included requirements of the unfilled shift include at least one of: required one or more skill, amount of incentive, bidding session start and end time, number of agents required, or any combination thereof.

12. The computerized-system of claim 9, wherein the preconfigured condition is bidding session end time.

13. The computerized-system of claim 9, wherein the bidding unit is further configured to calculate reduction in overtime payment cost by:
summing up reduction of each bid amount in the list of top lowest bidders from the proposed incentive amount.

14. The computerized system of claim 9, wherein the received one or more bid amounts placed by bidders is less than the proposed incentive amount.

15. The computerized system of claim 9, wherein the bidding notification is sent by a notification application.

16. The computerized system of claim 15, wherein the notification application is Amazon Simple Notification Service (SNS).

17. A computerized-method for reducing overtime payment cost in a contact center due to multiple agents unexpected absence, the computerized-method comprising:
in a computerized system comprising a processor, and a memory including a database of a plurality of agents with a respective plurality of shifts over a period of time and one or more respective assigned skills of each agent, stored thereon, operating by the processor a Workforce Management System (WEND to generate one or more notifications as to an unexpected absence of one or more agents in forthcoming one or more shifts, displaying said one or more notifications to a user via a display unit and enabling a bidding process via an Employee Engagement Manager (EEM) platform,
upon receiving a bidding request including requirements for an unfilled shift, via the EEM platform, operating a bidding unit that is integrated thereto, to create a bidding session, the bidding unit is configured to:
(a) retrieve from the database of the plurality of agents, one or more eligible agents according to the included requirements;
(b) send the one or more eligible agents a bidding notification with a proposed inceptive amount;

(c) receive one or more bid amounts placed by bidders wherein the bidders are one or more eligible agents who placed a bid;
(d) sort the received one or more bid amounts according to the value thereof;
(e) maintain a list of top lowest bidders having a preconfigured number of lowest bid amounts;
(f) notify each bidder if the hid amount that the bidder placed is included in the list of top lowest bidders and enable change of bid amount;
(g) repeat (c) through (f) until a preconfigured condition is met; and
(h) notify the bidders in the list of top lowest bidders that they are assigned to the unfilled shift and provide the user details of the top lowest bidders, via the display unit,
wherein the bidding unit is further configured to calculate reduction in overtime payment cost by:
summing, up reduction of each bid amount in the list of top lowest bidders from the proposed incentive amount.

18. A computerized system for reducing overtime payment cost in a contact center due to multiple agents unexpected absence, the computerized-system comprising:
a memory including a database of a plurality of agents with a respective plurality of shifts over a period of time and one or more respective assigned skills of each agent, stored thereon, and
a processor configured to:
operate a Workforce Management System (WFM) to generate one or more notifications as to unexpected absence of one or more agents in forthcoming one or more shifts and display said one or more notifications to a user via a display unit and enable bidding process via an Employee Engagement Manager (EEM) platform,
upon receiving a bidding request having requirements for an unfilled shift, via the EEM platform, operate a bidding unit that is integrated thereto to create a bidding session, the bidding unit is configured to:
(a) retrieve from the database of the plurality of agents, one or more eligible agents according to the included requirements;
(b) send the one or more eligible agents a bidding notification with a proposed incentive amount;
(c) receive one or more bid amounts placed by bidders wherein the bidders are one car more eligible agents who placed a bid and store it in an agents' bids database:
(d) sort the received one or more bid amounts according to the value thereof;
(e) maintain a list of top lowest bidders having a preconfigured number of lowest bid amounts;
(f) notify each bidder if the bid amount that the bidder placed is included in the list of top lowest bidders and enable change of bid amount;
(g) repeat (c) through (f) until a preconfigured condition is met; and
(h) notify the bidders in the list of top lowest bidders that they are assigned to the unfilled shift and provide the user details of the top lowest bidders via the display unit,
wherein the bidding unit is further configured to calculate reduction in overtime payment cost by:
summing up reduction of each bid amount in the list of top lowest bidders from the proposed incentive, amount.

* * * * *